United States Patent Office 3,483,160
Patented Dec. 9, 1969

---

3,483,160
ULTRAVIOLET LIGHT STABILIZED POLYVINYL CHLORIDE CONTAINING NICKEL COMPLEXES
Frank X. Werber, Ridgewood, N.J., and Nelson S. Marans, Silver Spring, Md., assignors to W. R. Grace & Co., New York, N.Y., a corporation of Connecticut
No Drawing. Filed Mar. 11, 1968, Ser. No. 711,857
Int. Cl. C08f 45/56, 45/62
U.S. Cl. 260—45.75                           5 Claims

ABSTRACT OF THE DISCLOSURE

Nickel diisopropanolamine nitrate or nickel cerous nitrate is blended with polyvinyl chloride resin to provide rigid polymer compositions having superior resistance to degradation under the influence of ultraviolet light.

---

This invention relates to stabilized polyvinyl chloride compositions. More particularly, this invention concerns polymer compositions that have superior resistance to the degradative effects of ultraviolet light, which comprise blends of polyvinyl chloride and metallic and mixed metallic nitrates.

Because of their relatively low cost and desirable physical and mechanical properties, there is presently a great demand for vinyl chloride polymers in applications where such polymers would be exposed to sunlight and other sources of heat and radiation, particularly ultraviolet radiation. However, because of the relative ease with which polyvinyl chloride becomes degraded by heat and light radiation, especially light in the ultraviolet range, it is necessary to in some manner stabilize the polymer against deleterious effects such as discoloration, cracking, and brittleness.

Heretofore many methods have been devised to light-stabilize unsubstituted polyolefins such as polyethylene, but progress in the field of light stabilization of polyvinyl chloride has been much slower. This lack of progress is due primarily because most additives that stabilize unsubstituted polyolefins do not successfully prevent degradation of polyvinyl chloride. Furthermore, because of the unique properties of vinyl chloride polymers, most additives that light stabilize unsubstituted polyolefins when used in polyvinyl chloride tend to stimulate thermal degradation, and, hence, cause severe darkening and brittleness when exposed to the high temperature required for manufacturing processes such as injection molding and extrusion.

Various studies have shown that polyvinyl chloride does not degrade via the same machanism as unsubstituted polyolefins. Whereas the latter seem to degrade by means of a free radical mechanism, i.e., the formation of peroxides, degradation of the formed is accompanied by the elimination of HCl, thus indicating a more ionic mechanism. It has further been shown that the thermal stability of polyvinyl chloride is adversely effected by most light stabilizing agents employed in the unsubstituted polyolefin art as stated supra, and this is generally attributed to the uniqueness of the mechanism through which vinyl chloride polymers thermally degrade.

Heretofore several methods have been devised for stabilizing polyvinyl chloride against the harmful effects of sunlight and other visible and ultraviolet light rays. Among these are the addition of such stabilizers as carbon black, alkali metal nitrate, and inorganic polymers such as those disclosed in U.S. Patent No. 3,344,207. Most of the methods attempted thus far, however, have one or more of the following disadvantages:

(1) Stimulation of thermal degradation;
(2) Incompatability with the polymer and subsequent exuding;
(3) Discoloration of the polymer; and
(4) Impairment of desirable physical properties.

This invention, therefore, is based on the discovery that polyvinyl chloride can be stabilized against the detrimental effects of sunlight, ultraviolet light, and visible light by incorporating into the polymer composition sufficient amounts of light stabilizing additives, and that those encompassed in the invention have none of the detrimental effects enumerated supra. The resulting polymer compositions have been found to possess the following characteristics:

(1) Improved light stability;
(2) Improved thermal stability;
(3) Improved color stability; and
(4) Unimpaired physical properties.

It has further been found that the additives claimed in the instant invention are compatible with the polymer and, hence, do not exude or "sweat out."

In summary, this invention is directed to a polymer composition comprising polyvinyl chloride and a light stabilizing nitrate compound selected from the group consisting essentially of nickel diisopropanolamine nitrate and nickel cerous nitrate.

In one embodiment of this invention, the light stabilizing compound is nickel diisopropanolamine nitrate in an amount of about 0.1–2 percent by weight based on the weight of polyvinyl chloride.

In another embodiment of this invention, the light stabilizing compound is nickel cerous nitrate present in an amount of about 0.1–2 percent by weight based on the weight of polyvinyl chloride.

As used herein, the terms "nickel diisopropanolamine nitrate" and "nickel cerous nitrate" include co-crystallized complex products derived from solutions containing nickel (II) nitrate and isopropanolamine or cerium (III) nitrate.

The amounts of such nitrate used in this invention is from 0.05–4 weight percent based on the weight of polyvinyl chloride resin in the composition. The nitrate selected may be used in amounts greater than 4 percent, but such amounts ordinarily do not further enhance the light stability of the polymer composition. The preferred amount of nitrate is between about 0.1 and 2 weight percent of the polyvinyl chloride resin.

The light stabilizing nitrate employed in this invention can be incorporated into the vinyl chloride polymer composition in any suitable manner. Said nitrate may be dissolved in a suitable solvent such as water, methanol, ethanol or the like and thus blended with the resin which may be powdered, granulated or pelleted. The nitrate may also be incorporated in the dry state as a powder or as granules. In any case, of prime consideration is that the nitrate be intimately and thoroughly dispersed throughout the resin composition. This is ultimately achieved by blending the light stabilizing nitrate-polyvinyl chloride mixture in the melt. Generally the mixtures are blended an a Brabender Plastograph, a heated, roller-type mixing device for blending polymers in the molten state. Other methods of molten polymer blending devices which are generally known to those skilled in the art may be used. The temperature at which blending is accomplished may be any temperature at which the resin composition melts provided said temperature is below that which would cause the resin composition to degrade thermally. The optimum temperature range for blending the compositions of the instant invention is 190–220° C.

The invention will be further illustrated by the following non-limitative specific examples. In the examples, the light stability of the polyvinyl chloride-nitrate compositions was determined in an accelerated exposure method utilizing an Atlas Color Fade-O-Meter, type FDA-R, a chamber having an actinic light source for use in radiating polymers. The light stability of samples treated in the Fade-O-Meter was determined by visual examination after selected time periods of light transmission and by comparison of the ability to flex samples without fracture before and after light exposure.

EXAMPLE I

Effect of light stabilizing nitrates on the thermal stability of polyvinyl chloride The following table illustrates the thermal stability of several polyvinyl chloride compositions. Finely divided polyvinyl chloride resin containing the amounts of light stabilizing nitrates indicated below was placed in a Brabender Plastograph at a head temperature of about 190° C. The samples were blended in the melt until a sudden increase in torque was necessary to maintain the same number of revolutions of the Brabender blades per unit time. Since this increase in torque is caused by polymer crosslinking (thermal degradation), comparison of the time before crosslinking of various samples is a comparison of their relative thermal stabilities.

| Run | Parts per 100 parts of resin | Time to crosslinking (minutes) |
| --- | --- | --- |
| A | 0.5 nickel diisopropanol amine nitrate | 11 |
| B | 0.5 nickel cerous nitrate | 9 |
| C | Control | 11 |

EXAMPLE II

Light stabilization of polyvinyl chloride with nickel diisopropanolamine nitrate Finely divided polyvinyl chloride was physically mixed with the following:

| Parts/hundred parts of PVC | Function |
| --- | --- |
| 0.5 nickel diisopropanolamine nitrate | Light stabilizer. |
| 5.0 polyglycerylorthoacetate | Thermal stabilizer. |
| 0.5 zinc acetylacetonate | Do. |
| 5.0 acryloid K 120 N-acrylic resin processing aid. | Processing aid for internal and external lubrication. |
| 0.5 stearic acid | External lubrication. |

This compositon was worked on a 2 roll mill at 185° C. for 8 minutes and the resultant sheet was pressed into 20 mil thick plaques on a hydraulically operated press having electrically heated platens (in this case a Carver press) at 200° C. and 10,000 p.s.i.g. for 2 minutes. One of said plaques was then exposed to a 1200 watt high pressure mercury arc lamp for 14 hours at a distance of eight inches from the lamp. This treatment resulted in no discoloration or embrittlement.

Another plaque was placed in an Atlas Color Fade-O-Meter. After 1000 hours there was no discoloration or embrittlement.

EXAMPLE III

Light stabilization of polyvinyl chloride with nickel cerous nitrate

The procedure of Example II was repeated with a polyvinyl chloride composition identical to that of Example II except that 0.5 part per hundred parts PVC of nickel cerous nitrate were substituted for the light stabilizer of Example II (nickel diisopropanolamine nitrate). As in Example II, the plaques containing the light stabilizing nitrate had no discoloration or embrittlement.

EXAMPLE IV

Light stabilization of polyvinyl chloride with a commercial U.V. stabilizer

The procedure of Example II was repeated using a polyvinyl chloride composition wherein the light stabilizer was 2,4-dihydroxybenzophenone instead of nickel diisopropanolamine nitrate. After exposure identical with those of Example II the polyvinyl chloride plaque had turned brown and become slightly embrittled.

We claim:

1. A light stabilized polymer composition comprising vinyl chloride polymer and a light stabilizing nitrate compound selected from the group consisting essentially of nickel diisopropanolamine nitrate and nickel cerous nitrate.

2. The composition of claim 1 wherein the light stabilizing nitrate is nickel diisopropanolamine nitrate.

3. The composition of claim 2 wherein the amount of said light stabilizing nitrate is about 0.1–2 percent by weight based on the weight of vinyl chloride polymer.

4. The composition of claim 1 wherein the light stabilizing nitrate is nickel cerous nitrate.

5. The composition of claim 4 wherein the amount of said light stabilizing nitrate is about 0.1–2 percent by weight based on the weight of vinyl chloride polymer.

References Cited
UNITED STATES PATENTS 3,210,321   10/1965   Doyle _____ 260—45.75

DONALD E. CZAJA, Primary Examiner

V. P. HOKE, Assistant Examiner